(12) United States Patent
Fujita et al.

(10) Patent No.: US 7,066,289 B2
(45) Date of Patent: Jun. 27, 2006

(54) TRACK SUPPORT SYSTEM FOR A CRAWLER

(75) Inventors: Kouhei Fujita, Tokyo (JP); Shigeyoshi Adachi, Tokyo (JP); Jyouji Okamoto, Tokyo (JP); Yuuichi Suehiro, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 316 days.

(21) Appl. No.: 10/469,004

(22) PCT Filed: Oct. 2, 2002

(86) PCT No.: PCT/JP02/10306

§ 371 (c)(1),
(2), (4) Date: Aug. 26, 2003

(87) PCT Pub. No.: WO03/049990

PCT Pub. Date: Jun. 19, 2003

(65) Prior Publication Data

US 2004/0079004 A1    Apr. 29, 2004

(30) Foreign Application Priority Data

Dec. 10, 2001    (JP)    .............................. 2001-375972

(51) Int. Cl.
*B62D 55/14*    (2006.01)
(52) U.S. Cl. ........................ 180/9.1; 305/138
(58) Field of Classification Search ................ 180/9.5; 305/136, 138, 139, 140, 141, 142, 124
See application file for complete search history.

(56) References Cited

U.S. PATENT DOCUMENTS

| | | | | | |
|---|---|---|---|---|---|
| 1,394,995 A | * | 10/1921 | Holt | ............................ | 305/139 |
| 1,720,553 A | * | 7/1929 | Jett | ............................ | 280/785 |
| 2,926,969 A | * | 3/1960 | Ashley, Jr. | .................. | 180/9.52 |
| 3,843,214 A | * | 10/1974 | Piepho | ........................ | 305/119 |
| 4,371,362 A | * | 2/1983 | Dorris | ........................ | 474/198 |
| 4,501,452 A | * | 2/1985 | Huang | ........................ | 305/132 |
| 5,104,205 A | * | 4/1992 | Motomura et al. | ......... | 305/109 |

FOREIGN PATENT DOCUMENTS

| JP | 53-074832 | 3/1978 |
|---|---|---|
| JP | 59-160485 | 9/1984 |

* cited by examiner

*Primary Examiner*—Tony Winner
(74) *Attorney, Agent, or Firm*—Oliff & Berridge, PLC

(57) ABSTRACT

Mud and sand are prevented from entering between support-receiving members since both ends of the roller shaft are constructed so as to be held at both sides thereof when providing the upper roller on the travelling body frame secured in a civil engineering apparatus. The first and second support receiving members 19, 20 are constructed so that the members respectively support both end portions of the roller shaft 17a of the upper roller 17 on the upper part of the track frame 11 and cross frame 12 on the travelling body frame 10 secured at the lower part of the civil engineering apparatus, wherein the roller supporting portions 19a, 20b and a pair of coupling pieces 19a, 20a for coupling the roller supporting portions 19b, 20b to the travelling body frame 10 are formed to be substantially reverse U-shaped.

11 Claims, 7 Drawing Sheets

TRACK SUPPORT SYSTEM FOR A CRAWLER

TECHNICAL FIELD

The invention relates to a crawler traveling apparatus that is used as a traveling apparatus for a hydraulic excavator and tractor.

BACKGROUND OF THE INVENTION

Generally, some work machines have a crawler traveling apparatus, such as a hydraulic excavator and a tractor, which are used as a traveling apparatus for transporting an apparatus body. Such a crawler traveling apparatus is provided with a drive sprocket (drive wheel) at one end in the forward and backward directions and an idler wheel (driven wheel) at the other end at both left and right sides of the traveling frame. The traveling frame is secured at the lower part of the body, and a crawler belt is wound around both of the wheels (drive and driven). The crawler belt moves endlessly around both the wheels in line with driving rotations of the drive sprocket, and the apparatus body travels forward or backward. In this case, with respect to the crawler belt wound around both the wheels, a plurality of lower rollers (grounding rollers, lower rolling rollers, and track rollers) are provided on the ground side (lower portion), and upper rollers (upper rolling rollers and carrier rollers) are provided on the non-ground surface side (upper portion). The rollers guide movement of the crawler belt.

The above-described upper rollers are supported by a support receiving member integrally secured on the traveling frame. There is, for example, a type in which both-end portions of the roller shaft are supported by the support receiving member. Such types as shown in, for example, FIGS. 7(A) and (B) have been publicly known as such a prior art structure. The support receiving member 21 is structured so that an opening 21a, into which the upper roller 22 is loosely fitted, is formed at the central portion of a rectangular flat-shaped member. The support receiving member 21 is provided with a surrounding roller supporting portion 21b with opposing side surfaces to support the roller shaft and a pair of forward and backward extending plate-shaped coupling pieces 21c for coupling the roller supporting portions 21b to the traveling body frame.

In the above-described prior art support receiving member 21, because each coupling piece 21c is formed to be like a long plate-shaped member extending in the roller shaft direction, that is, in the direction orthogonal to the traveling direction of the crawler belt, there are cases where mud and sand may enter between a pair of the forward and backward coupling pieces 21c where the work machine travels on soft ground in a mountainous area. Once mud and sand enter, it is difficult to discharge the mud and sand. In particular, in the winter season, the above-described mud and sand that has entered between the coupling pieces 21c may become frozen, wherein there occurs the problem that smooth rotation of the upper rollers 22 is hindered.

Therefore, it is proposed that, as shown in FIG. 7(C), the support receiving member is formed as a segmented type. Each end portion of the roller shaft is, respectively, supported by one pair of supporting receiving members 23 so as not to accumulate mud and/or sand between the support receiving members 23. However, in this type of support, because a roller supporting portion 23a for supporting the roller shaft and coupling piece 23b for coupling the traveling body frame are integrally formed, it is difficult to fine-adjust the attaching position of the upper roller shaft on the support receiving members 23 which results in another problem, that is, the positional accuracy of the upper rollers cannot be secured. In any one of the above examples, there are shortcomings incidental to the type of support. Accordingly, the invention is meaningful in view of solving the above-described problems and shortcomings.

SUMMARY OF THE INVENTION

The invention was developed in view of the above-described situations. It is an object of the invention to solve the problems and shortcomings, wherein the invention provides a crawler traveling apparatus in which a pair of forward and backward wheels are rotatably disposed at both left and right sides of the traveling body frames, secured at the lower part of a machine body, and crawlers are wound around the wheels, wherein when both end portions of the roller shafts of the upper rollers for guiding and transferring the above-described crawlers are supported by the support receiving members secured on the traveling body frames, the above-described support receiving members are formed to be substantially reverse U-shaped by roller supporting portions having the above-roller shafts supported thereon and a pair of coupling pieces for coupling the corresponding roller supporting portions to the traveling body frames.

Thereby, no mud and/or sand accumulate between the coupling pieces, and it is possible to adjust the position of the support receiving portion by adjusting the attaching state of the roller supporting portion and the coupling pieces.

In the above-described crawler traveling apparatus, the roller supporting portions of the respective supporting receiving members according to the invention can be integrated with the coupling pieces in a state where the positions thereof are adjusted in the forward/backward directions and vertical direction with respect to the coupling pieces.

BRIEF DESCRIPTION OF THE DRAWINGS

The invention will be described with reference to the drawings, in which.

DETAILED DESCRIPTION OF THE INVENTION

Figure 1:
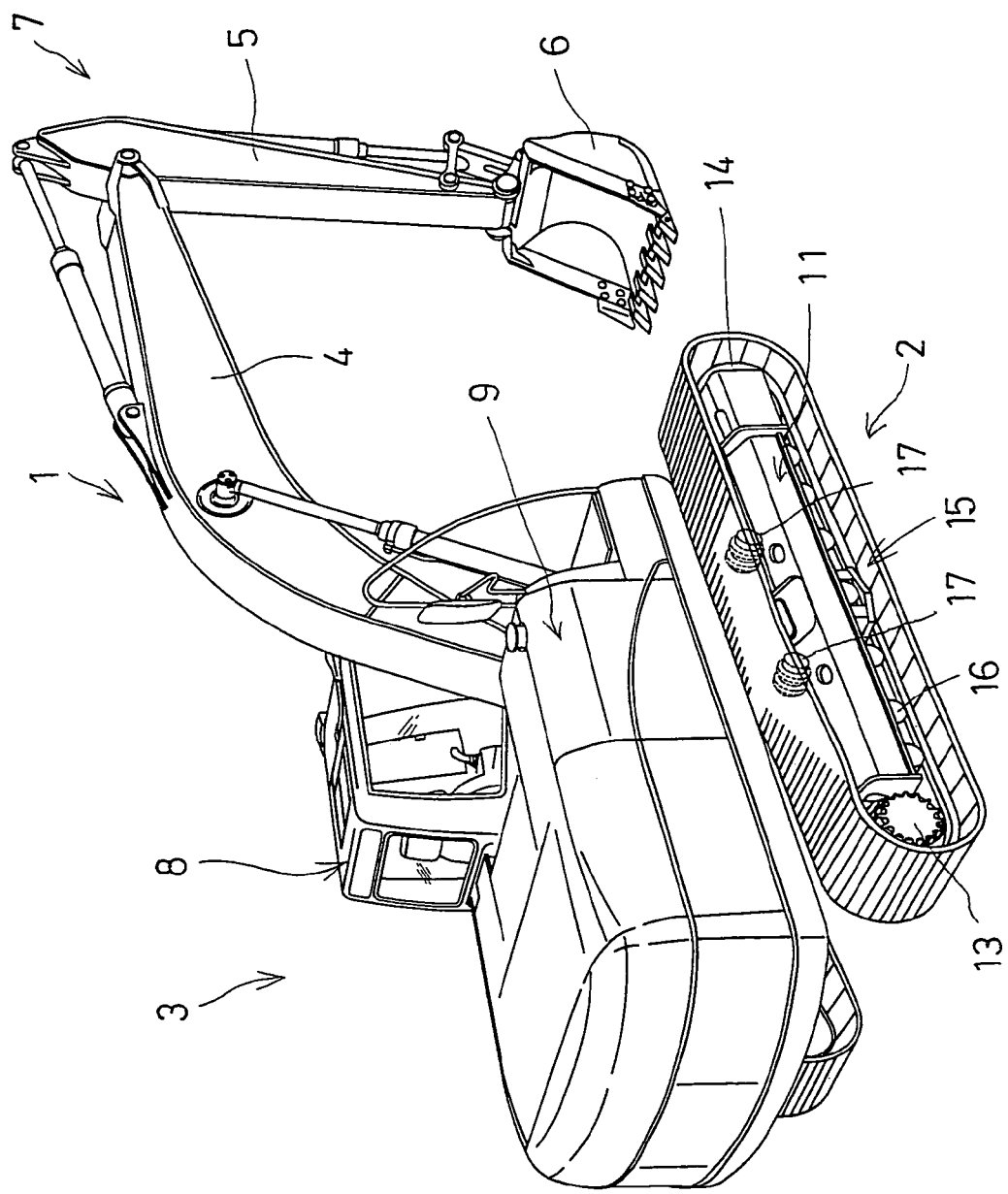
FIG. 1 is a perspective view showing a hydraulic shovel.
Figure 2:
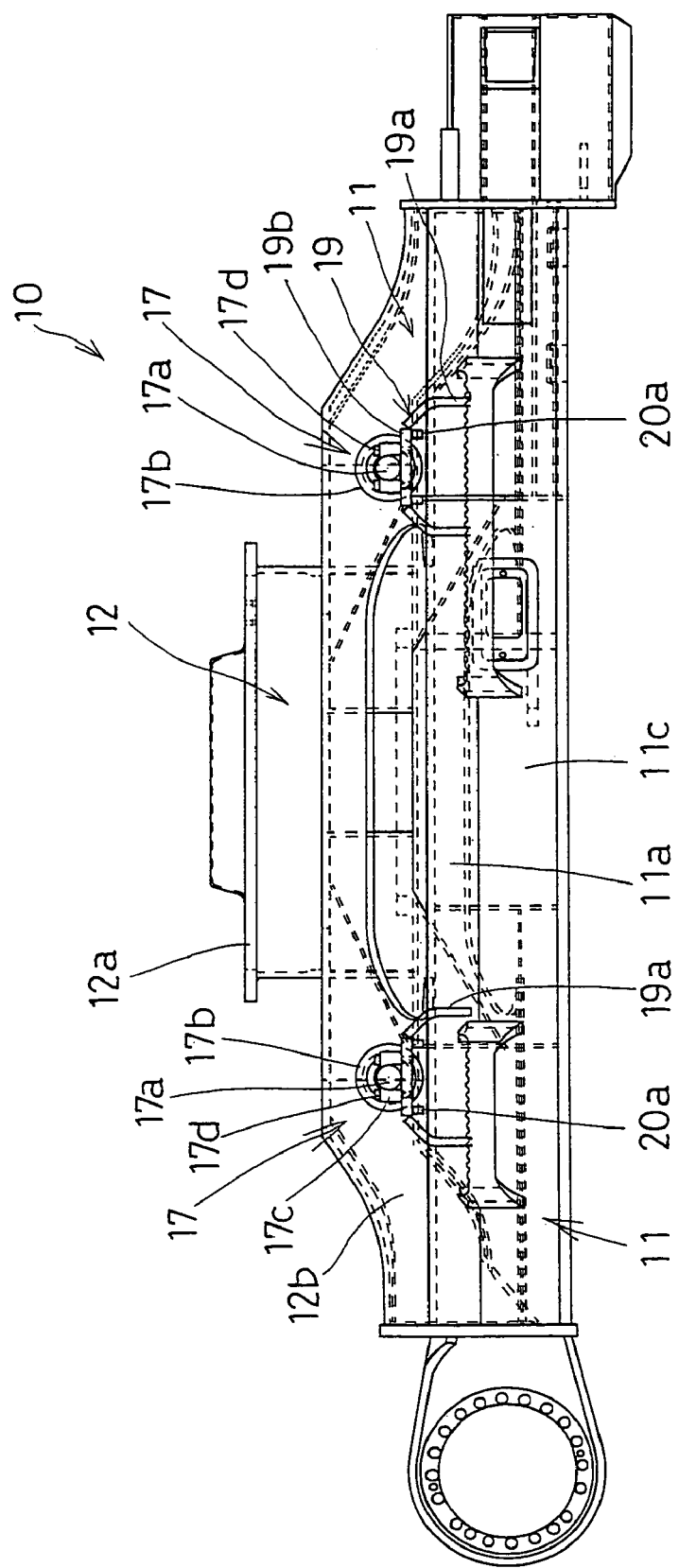
FIG. 2 is a side elevational view of a traveling body frame.

A description is given of an embodiment of the invention on the basis of FIG. 1 through FIG. 6.

In the drawings, reference number 1 denotes a hydraulic shovel. The hydraulic shovel 1 is such that an upper structure 3 is supported so as to swivel above a lower structure 2 that is a crawler type traveling apparatus. A front attachment 7 including member devices, such as a boom 4, an arm 5, a bucket 6, etc., is mounted roughly at the central portion of the upper structure 3. Further, a cabin 8 is provided to one side of the above-described front attachment 7. A tank chamber 9 for a fuel tank and an operation oil tank, etc., is disposed to the other side thereof. That is, the basic structure is similar to that of a prior art apparatus.

Reference number 10 is a traveling body frame that constitutes the above-described lower structure 2. The traveling body frame 10 is formed so that track frames 11 positioned at both sides (for purposes of explanation, left and right sides based on forward movement of the hydraulic shovel) and extending in the forward/backward directions are integrated with a cross frame 12, formed so as to integrate the track frames 11. A coupling portion 12a for coupling the upper structure 3 via a joint member (not illustrated) protrudes upward from the cross frame 12. Drive sprockets 13 are rotatably supported at the rear end portions of the left and right track frames 11 (in the normal direction of forward movement), respectively, and idle wheels 14 are rotatably supported at the front end portions thereof, respectively. An endless track belt (crawler) 15 is wound around both forward and backward wheels 14, 13. Thus, the crawler 15 is actuated in line with rotating drive of the above-described drive sprockets 13 in either one of forward and reverse directions. Based thereon, the machine body travels in the forward/backward direction of the apparatus body.

In order to secure smooth motions of the crawler 15, that is, to carry out smooth traveling of the machine body, a plurality of lower rollers 16 are rotatably provided on the above-described respective track frames 11 juxtaposed in the forward and backward directions, which press the portion located at the ground surface side of the crawler 15 wound around both the above-described wheels 13, 14 in the ground direction, guide and move the crawler 15. In addition, upper rollers 17 are provided at two points in the forward and backward directions on the respective track frames 11, which press the non-ground surface side (upper side) of the crawler 15 upwards, guide and transfer the crawler 15 while preventing the crawler 15 from becoming loose. The invention is carried out in an attaching structure of the upper rollers 17. Also, in the embodiment, although the upper rollers 17 are provided at two points in the forward and backward directions of the rack frame 11, the upper roller may be provided at one point, or three points or at an appropriate plurality of points depending on the type of machine using a crawler 15.

Here, the left and right track frames 11 are formed of a steel material so as to become ridge-like in a front view. The left and right track frames 11 are disposed to be linearly symmetrical. To simplify the description, the description is given of only the track frame (right track frame) 11 positioned at the lower side in FIG. 3 and no separate description is given of the left track frame 11.

Figure 3:
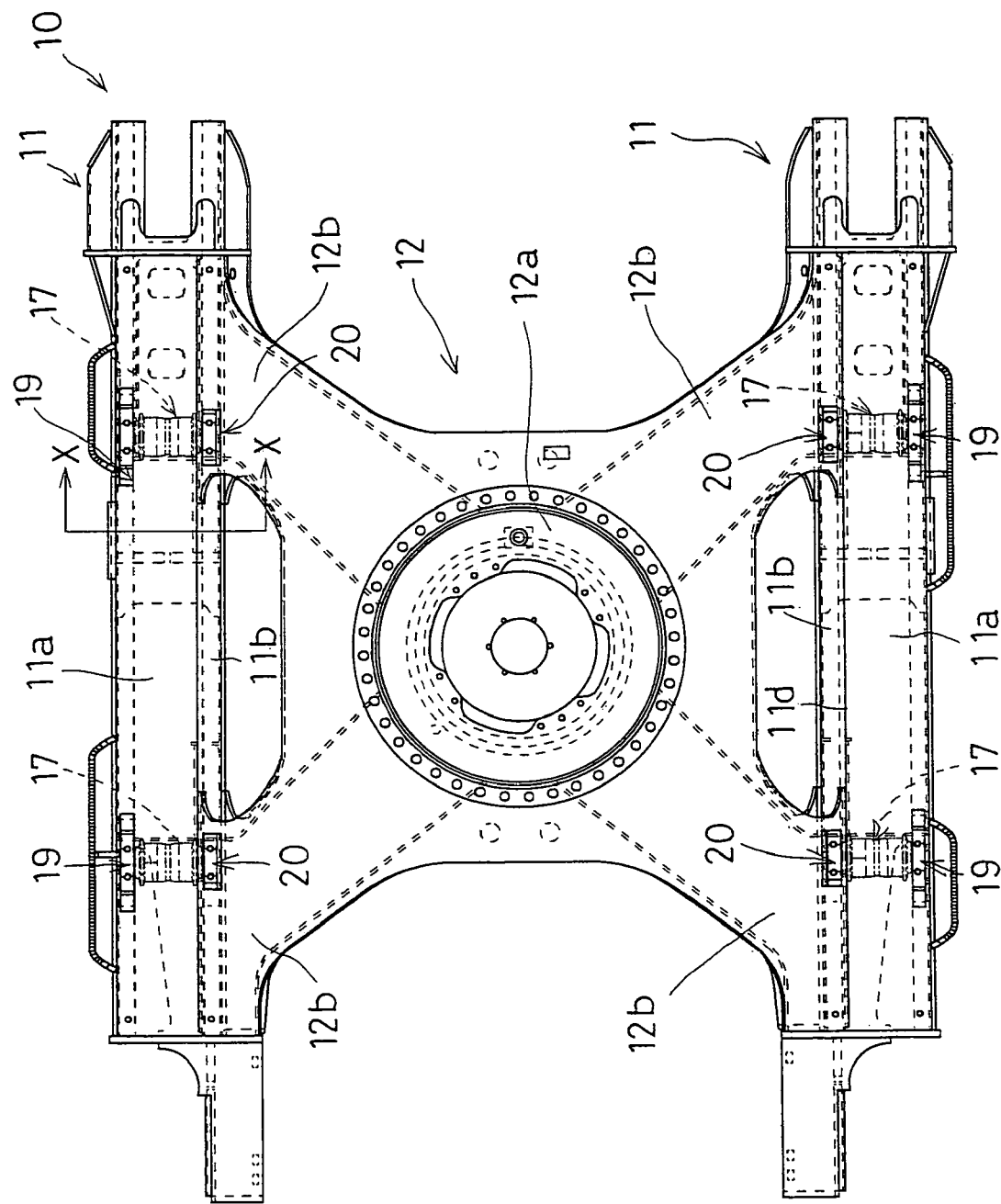
FIG. 3 is a plan view of the traveling body frame.
Figure 4:
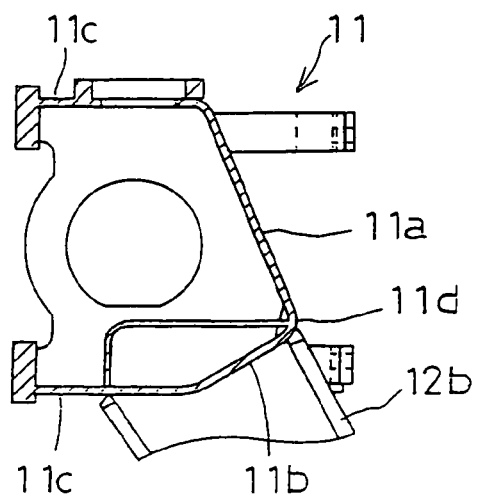
FIGS. 4(A), (B) and (C) are, respectively, a sectional view taken along the line 4—4 in FIG. 3, a plan view showing the major parts therein, and a view taken along the arrow 5—5 in FIG. 4(B)
Figure 4:
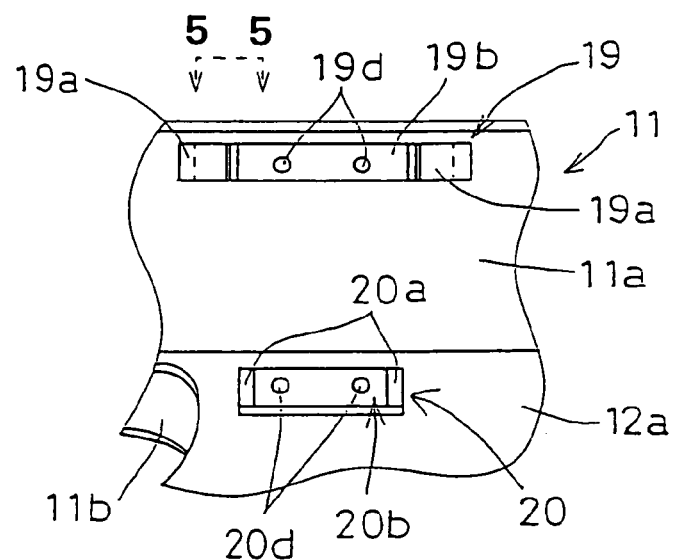
Figure 4:
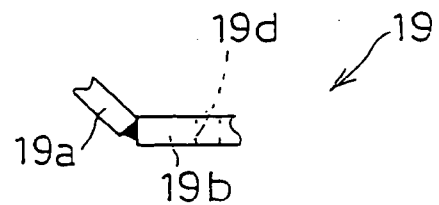
Figure 5:
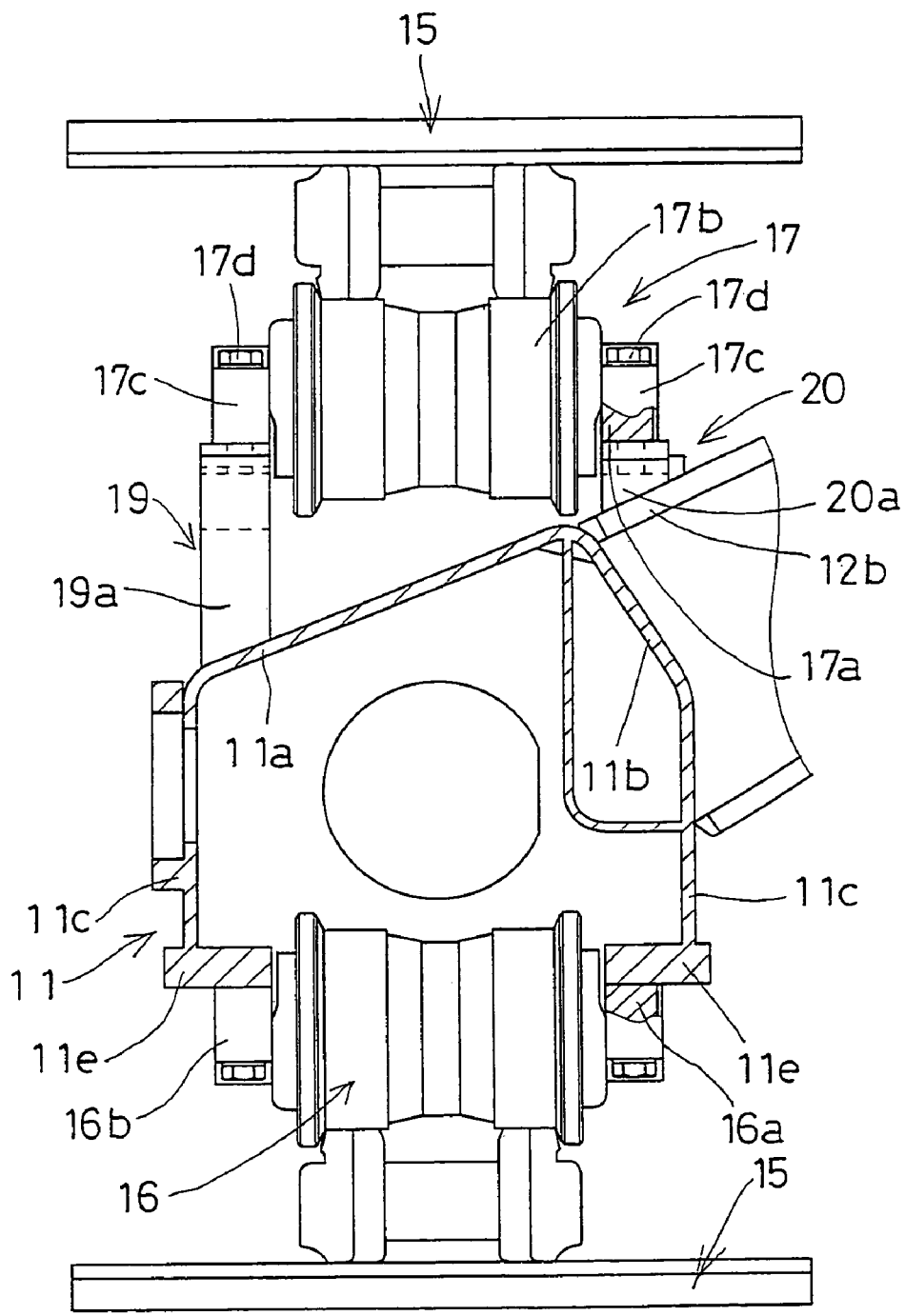
FIG. 5 is a sectional view of the traveling body frame for describing the attaching state of upper rollers.
Figure 6:
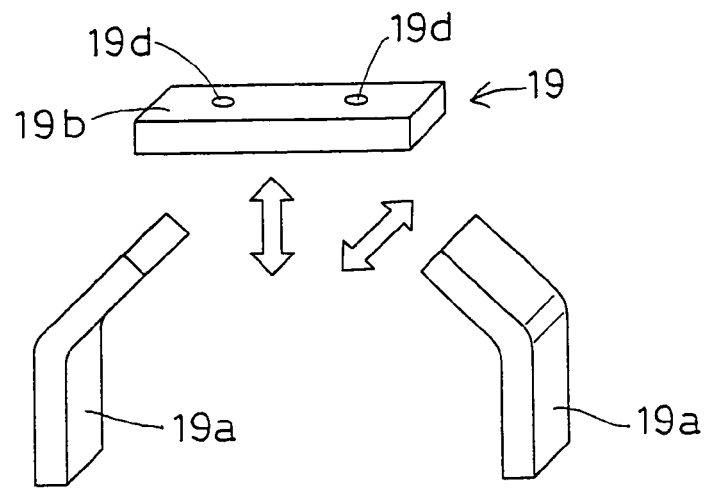
FIGS. 6(A) and (B) are, respectively, a disassembled perspective view of a support receiving member, and a perspective view for describing actions of the support receiving member.
Figure 6:
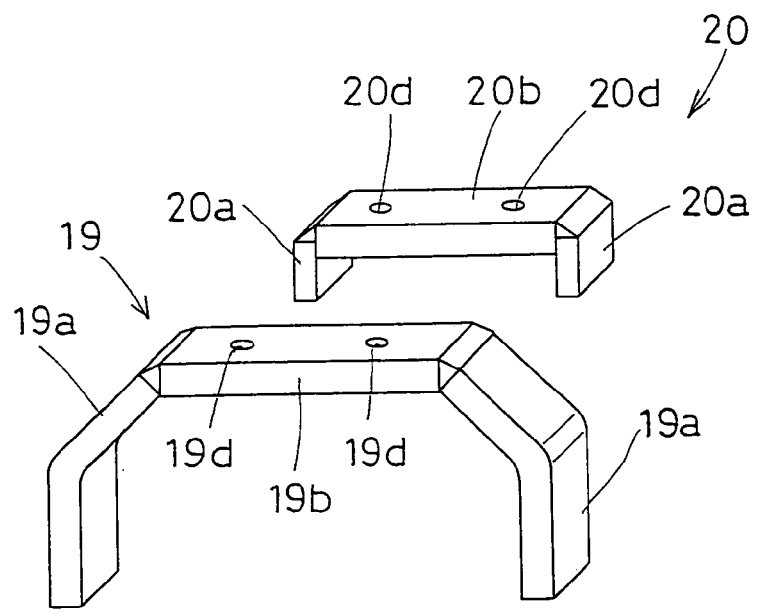
Figure 7:
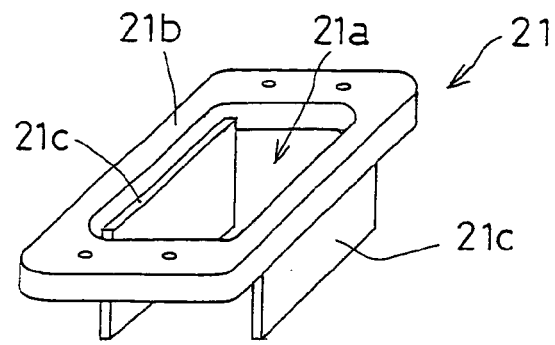
FIGS. 7(A), (B) and (C) are, respectively, a perspective view showing a first prior art example, a perspective view showing the state of incorporating the upper roller in the first prior art example, and a perspective view showing a second prior art example.
Figure 7:
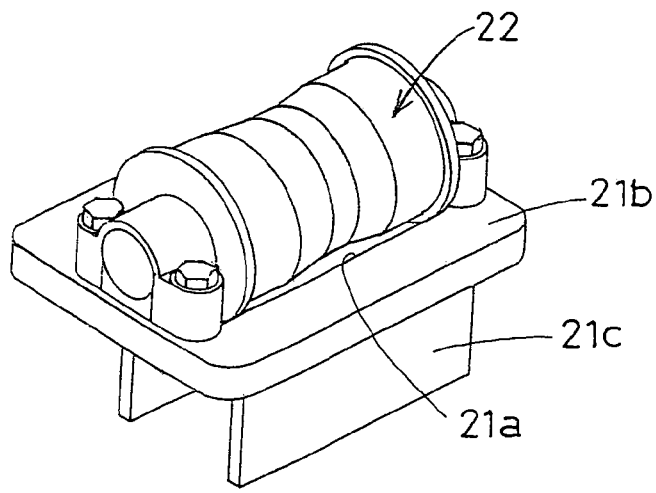
Figure 7:
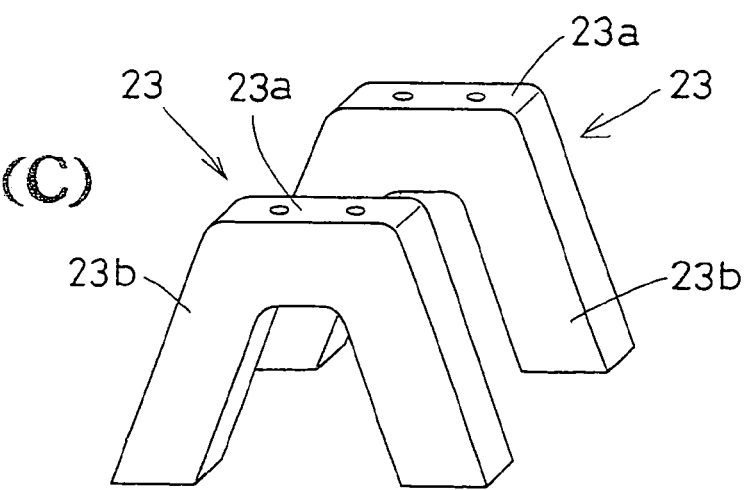

As described above, the track frame 11 is formed to be like a ridge, wherein it consists of a gently inclined first upper side 11a (FIG. 5), positioned at the outer side of the machine body, the inclination length of which is relatively long with the height thereof gradually increased toward the inner side of the crawler, a sharply inclined second upper surface 11b (FIG. 5), positioned at the inner side thereof, the inclination length of which is relatively short with the height decreasing toward the inner side of the crawler, and both left and right side pieces 11c. Thus, the track frame 11 is ridge-like, in which the intersection or joining region between the first upper surface 11a and the second upper surface 11b forming the top portion 11d (FIGS. 3 and 5). End portions of four extending members 12b that radially extend from the connection portion 12a form the cross frame 12 and are integrated at the forward and backward end portions of the top portion 11d. Also, the extending members 12b are formed so as to be inclined with the height thereof gradually increased toward the connection portion 12a side.

A pair of forward and backward upper rollers 17 are mounted above the track frame 11. Each upper roller 17 is provided with a roller shaft 17a and a roller portion 17b rotatably fitted over the roller shaft 17a. For each upper roller 17, the roller shaft 17a is disposed in a direction orthogonal to the track frame 11 so that the rotating direction of the roller portion 17b is turned in the transporting or moving direction (the forward and backward direction) of the crawler 15. The respective roller shafts 17a are supported at the outer axial end by the first upper side 11a of the track frame and a first support receiving member 19 and, on the inner axial end by a second support receiving member 20 positioned and fixed on the extending member 12b (disposed above the second upper surface 11b) of the cross frame 12 that is opposite to the first upper surface 11a.

The first and second support receiving members 19, 20 will be described referring to FIGS. 6(A) and 6(B) First, the first support receiving member 19, secured on the upper surface of the first upper side 11a of the track frame and which supports the outer axial end of the roller shaft 17a, is provided with a pair of forward and backward coupling pieces 19a which are elongated in the vertical direction and have an upper end portion which is folded or bent toward the opposing connecting piece 19a. A roller supporting portion 19b is fixed between the upper end portions of the coupling pieces 19a. Further, the assembled first support receiving member 19 is structured to be C-shaped in a side elevational view, wherein the lower end portion of each of the coupling pieces 19a is fixed to the first upper side 11a by welding, etc. A pair of forward and backward threaded holes 19d are formed on the upper surface of the roller supporting portion 19b, which allows fixing of the outer axial end of the roller shaft 17a using an axial support member 17c fixed to the threaded holes 19d by screws 17d passing through openings in the axial support member 17c.

On the other hand, the second supporting receiving member 20, which is provided on the cross frame extending portion 12b at a higher position than the surface of the first upper side 11a and supports the inner axial end of the roller shaft 17a is structured to be shorter than the first supporting receiving member 19. Furthermore, the second supporting receiving member 20 is provided with a pair of forward and backward coupling pieces 20a oriented vertically and a roller supporting portion 20b is fixed between the upper end portions of the coupling pieces 20a. The second supporting receiving member 20 is structured to be roughly C-shaped in its side elevational view. In addition, the lower end portion of the coupling pieces 20a are fixed by means of welding, etc., on the extending portion 12b. A pair of forward and backward threaded holes 20d, are used to fix the outer axial end of the roller shaft 17a by use of screws 17d, are provided on the upper surface of the roller supporting portion 20b of the second support receiving member 20. By fixing both axial ends of the roller shaft 17a of the upper roller 17 on the first and second support receiving members 19, 20, via a corresponding axial support member 17c, the respective upper rollers 17 are structured so that they are supported by being held at both sides of the traveling body frame 10 by four pairs of coupling pieces 19*a*, 20*a* located at the forward and backward sides and the right and left sides.

In addition, in a state where the upper rollers 17 are mounted, the upper side tangential position of the upper rollers 17 is established so as to be higher, from the ground, than the upper tangential position of both the forward (idle wheels) and backward wheels (drive sprockets) 14, 13, wherein the locus of the upper portion of the crawler 15 is set so as to be raised to an upper level. Thereby, the structure is suitable for a case where the crawler 15 runs even on soft ground.

In addition, in the described structure, the first and second support receiving members 19, 20 are mounted on the traveling body frame 10 in a state where the positions in the respective vertical directions and positions in the respective lateral directions are adjusted. Thus it is possible to adjust the mounted states of the respective upper rollers 17.

That is, the respective support receiving members 19, 20 are structured so as to be integrated by attaching and fixing the roller supporting portions 19*b*, 20*b* between the upper end portions of a pair of coupling pieces 19*a*, 20*a* by means of welding. With respect to the fixing positions of the roller supporting portions 19*b*, 20*b* for the coupling pieces 19*a*, 20*a*, that is, the fixing positions of the roller supporting portions 19*b*, 20*b* on the upper end portion end surface of the coupling pieces 19*a*, 20*a*, as shown in FIG. 6(A), it is possible to shift the fixing positions in the plate thickness direction in the vertical directions and in the plate width direction in the lateral directions. That is, by welding and attaching the roller supporting portions 19*b*, 20*b* with their positions shifted, the positions thereof can be adjusted. Thereby, it is possible to absorb the dimensional errors due to assembling at the attaching position of the upper rollers 17 by adjusting the support receiving members 19, 20.

Also, each lower roller 16 is structured as is the above-described upper roller 17. Both end portions of the roller shaft 16*a* are supported at the lower end portion of the side piece 11*c* on each side of the track frame. That is, a wide mounting side piece 11*e* is integrated at both lateral directions of the lower end portion of the side piece 11*c* on each side of the track frame. Here, the axial supporting member 16*b*, in which the roller shaft axial end of the lower roller 16 is internally supported, is set so as to be screwed onto and fixed to the attaching shoulder portion 11*e* in a state where a prescribed clearance between lower rollers 16 is provided in the forward and backward directions.

In the embodiment of the invention, which is structured as described above, the hydraulic shovel 1 travels on the basis of endless transport or movement of the crawler 15 suspended at and attached to the left and right track frames 11 that constitute the traveling body frame 10. In this case, the upper rollers 17 guide and transport the crawler 15 and are axially supported via the first and second supporting receiving members 19, 20 to which both. left and right axial ends of the roller shaft 17*a* are attached. The roller shafts 17*a* are fixed to the traveling body frame 10 (specifically to the first upper surface 11*a* of the track frame 11 and the cross frame extension piece 12*b*) in a state where both axial ends of each of the upper rollers 17 are held. Therefore, the upper rollers 17 are constructed to be tough in structure. Further, in the structure, because both axial ends of the roller shafts 17*a* are individually supported by the first and second support receiving members 19, 20 it is possible to prevent mud and sand from entering between the first and second support receiving members 19, 20. Therefore unlike the prior art case in which the left and right support receiving members are integrated, the invention surely avoids the problem that rotations of the roller shafts are hindered because mud and sand enter between the forward and backward coupling pieces and are not discharged therefrom.

Further, because the embodiment is structured so that the first and second support receiving members 19, 20 which support a respective axial end of the roller shaft 17*a* are segmented into a pair of forward and backward coupling pieces 19*a*, 20*a* and roller supporting portions 19*b*, 20*b*. The roller supporting portions 19*b*, 20*b* are attached to and fixed between the upper end portions of the coupling pieces 19*a*, 20*a*. When attaching and fixing the roller supporting portions 19*b*, 20*b* to the coupling pieces 19*a*, 20*a*, it is possible to adjust the mounting positions of the upper rollers 17 with respect to the track frame 11 by attaching and fixing the roller supporting portions 19*b*, 20*b* to the coupling pieces 19*a* with the positions thereof adjusted in both the vertical and lateral directions. As a result, for example, even in the case where there exists an error in the assembling of the traveling body frame 10, the positional accuracy of the upper rollers 17 can be improved by carrying out the above-described adjustment in the assembling (attaching and fixing) process for the respective support receiving members 19, 20.

The invention is widely applicable to the case where a support receiving member for supporting the upper roller is provided. However, it is further effective in a case where mud and sand are prevented from accumulating in the vicinity of the support receiving portion and the positional accuracy of the upper roller can be improved.

What is claimed is:

1. A crawler traveling apparatus, comprising:
a pair of connected track frames, a track frame on each side of the crawler traveling apparatus;
a pair of wheels rotatably disposed on each track frame, a forward wheel at an end in a principal direction of apparatus movement and a backward wheel at an end opposite to the principal direction of movement;
a crawler wound around each pair of wheels;
at least one upper roller mounted to each track frame, each upper roller having a roller shaft and a roller body, wherein axial ends of the roller shaft of each upper roller is supported by a support receiving member secured at least on the track frame, said support receiving member is formed to be substantially reverse U-shaped comprising a separate roller supporting portion and a pair of coupling pieces, the roller supporting portion attached to and between the pair of coupling pieces, for coupling the roller supporting portion to at least the track frame, the roller supporting portion supporting an axial end of the roller shaft.

2. The crawler traveling apparatus as set forth in claim 1, wherein the roller supporting portion of the support receiving member is attached in a state where the positions thereof are adjusted in the forward and backward directions and vertical direction with respect to the coupling pieces.

3. A track support system, comprising:
a cross frame;
a track frame mounted to the cross frame;
a first supporting member mounted to the track frame;
a second supporting member offset from the first supporting member and mounted to an arm of the cross frame; and
a roller with a roller shaft, the roller shaft rotatably mounted at an axial end to each of the first supporting member and the second supporting member.

4. The track support system according to claim 3, wherein the axial ends of the roller shaft are rotatably mounted to the first supporting member and the second supporting member by axial supporting members.

5. The track support system according to claim 3, wherein each of the first supporting member and the second supporting member comprises a pair of opposing coupling pieces and a roller supporting portion extending between the coupling pieces.

6. The track support system according to claim 5, wherein the axial end of the roller shaft is received on the roller supporting portion.

7. The track support system according to claim 6, further comprising an axial supporting member attached to the roller supporting member to rotatably retain the axial end of the roller shaft.

8. The track support system according to claim 3, wherein the cross frame has four arms, two arms extending to each side of a center of the cross frame, and a track frame is mounted to the two arms on each side with an assembly of the first supporting member, the second supporting member and the roller mounted proximate an arm and track frame junction.

9. The track support system according to claim 5, wherein positioning of the roller supporting portion between the coupling pieces can be adjusted in the vertical and horizontal directions.

10. The track support system according to claim 3, further comprising at least one lower roller set mounted to a lower surface of the track frame, the track frame having a generally upside down U-shaped cross section.

11. The track support system according to claim 10, wherein the lower roller set comprises:
a roller with a roller shaft; and
a pair of axial supporting members, each axial supporting member mounted to a lower side of the track frame to rotatably retain each axial end of the roller shaft.

* * * * *